United States Patent

Grawey et al.

[19]

[11] 3,864,188
[45] Feb. 4, 1975

[54] TIRE WRAPPING MACHINE

[75] Inventors: Charles E. Grawey, Peoria; Robert W. Untz, Hanna City; Ronald L. Satzler, Metamora; Jesse R. Berchtold, Pekin; Floyd S. Dadds, Peoria, all of Ill.

[73] Assignee: Caterpillar Tractor Co., Peoria, Ill.

[22] Filed: Apr. 16, 1973

[21] Appl. No.: 351,779

[52] U.S. Cl. .......... 156/397, 156/117, 156/143, 156/173, 242/4, 249/62, 264/221, 264/317, 425/DIG. 12
[51] Int. Cl. ........................ B29h 17/02
[58] Field of Search .......... 156/110, 117, 118, 121, 156/123, 124, 143, 144, 173, 175, 394, 397, 425, 429; 264/221, 315, 317, 326, DIG. 44; 425/DIG. 12; 249/61, 62; 242/4, 7.12, 7.15, 79, 117, 158

[56] References Cited
UNITED STATES PATENTS

| | | | |
|---|---|---|---|
| 1,213,600 | 1/1917 | Dunkerley | 156/124 |
| 1,248,871 | 12/1917 | Kremer | 156/128 |
| 2,915,102 | 12/1959 | Alexeff et al. | 156/123 |
| 3,057,396 | 10/1962 | Hanson | 156/117 |
| 3,245,853 | 4/1966 | Reinhart | 156/117 |
| 3,458,146 | 7/1969 | Warner | 156/397 |
| 3,606,921 | 9/1971 | Grawey | 156/117 X |

Primary Examiner—Clifton B. Cosby
Assistant Examiner—John E. Kittle
Attorney, Agent, or Firm—Phillips, Moore, Weissenberger Lempio & Strabala

[57] ABSTRACT

Disclosed herein is apparatus for winding substantially inextensible flexible filament material or extensible flexible rubber material on and about the body of a toroidal member of oval cross-section (in this particular embodiment a disintegrable tire core). The apparatus includes rollers which support the toroidal member with the mid-circumferential plane thereof substantially vertical. The apparatus also includes a guide ring encircling the body of the toroidal member and supported in a substantially horizontal disposition. Drive means are included for rotating the guide ring about its axis and about the body of the toroidal member, meanwhile rotating the toroidal member about its axis, so that the toroidal member is advanced through the rotating guide ring. A supply of filament material is mounted on the guide ring to travel therewith, and extends to the surface of the toroidal member, so that such rotation of the guide ring and toroidal member as described above winds the filament material about and along the body of the toroidal member. In cooperation with such supply of filament material, means are included for providing relatively constant and even tensioning of the filament material being applied to the surface of the toroidal member, taking into account the oval cross-section of the toroidal member. A supply of extensible rubber material may be mounted on the guide ring to travel with the guide ring in place of the supply of the filament material. The rubber material extends from the supply to the surface of the toroidal member, so that rotation of the guide ring and toroidal member as described above winds the rubber material about and along the body of the toroidal member. In cooperation with such supply of rubber material, means are included for extending or stretching the rubber material continuously a substantially constant amount before it is supplied to the surface of the toroidal member, and depositing on said surface a substantially uniformly stretched material, taking into account the oval cross-section of the toroidal member. The support roller system, on which the toroidal member rotates, includes a bogey system to allow for change in the size of the toroidal member due to the wrapping of the materials thereon.

53 Claims, 15 Drawing Figures

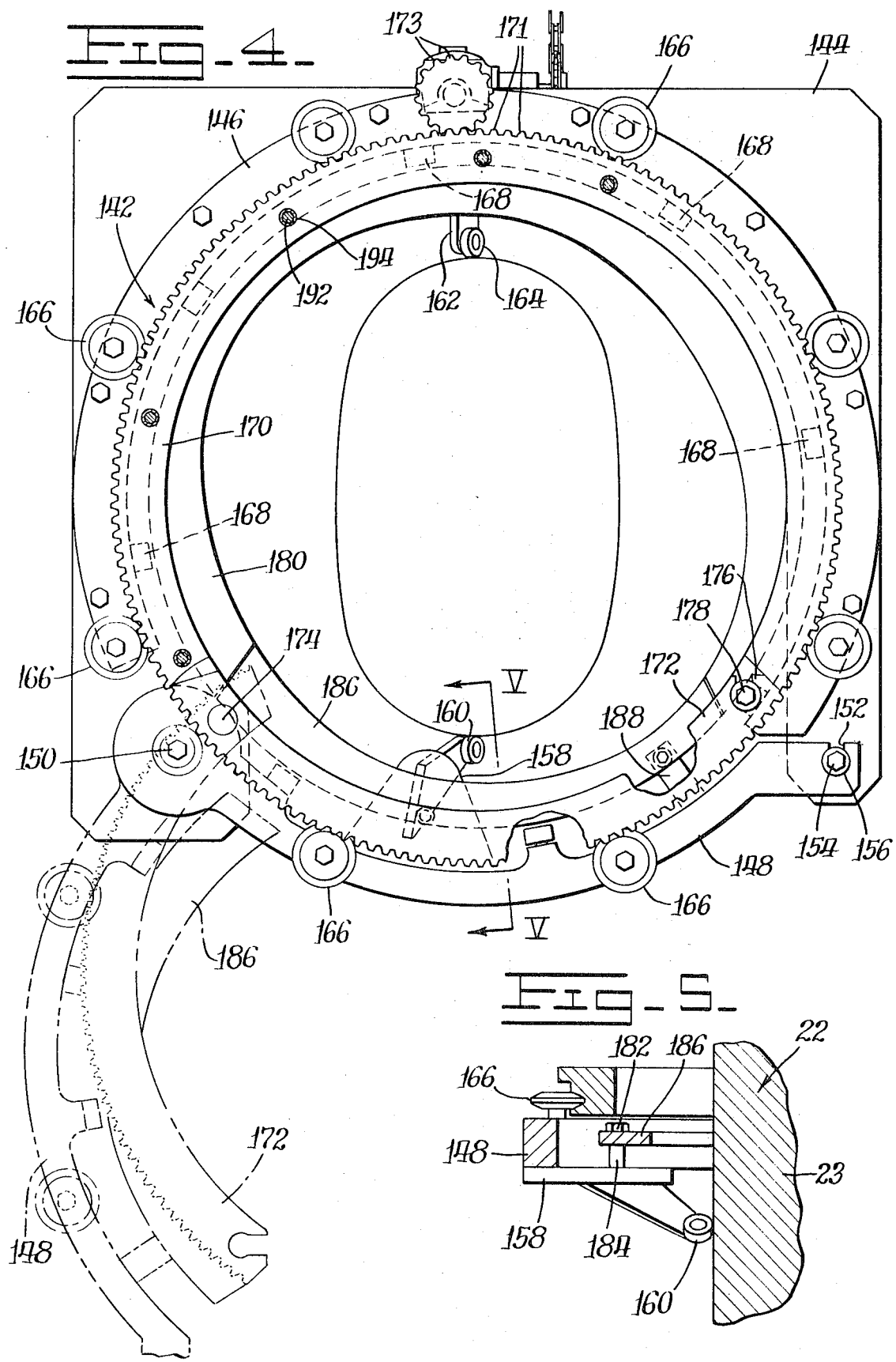

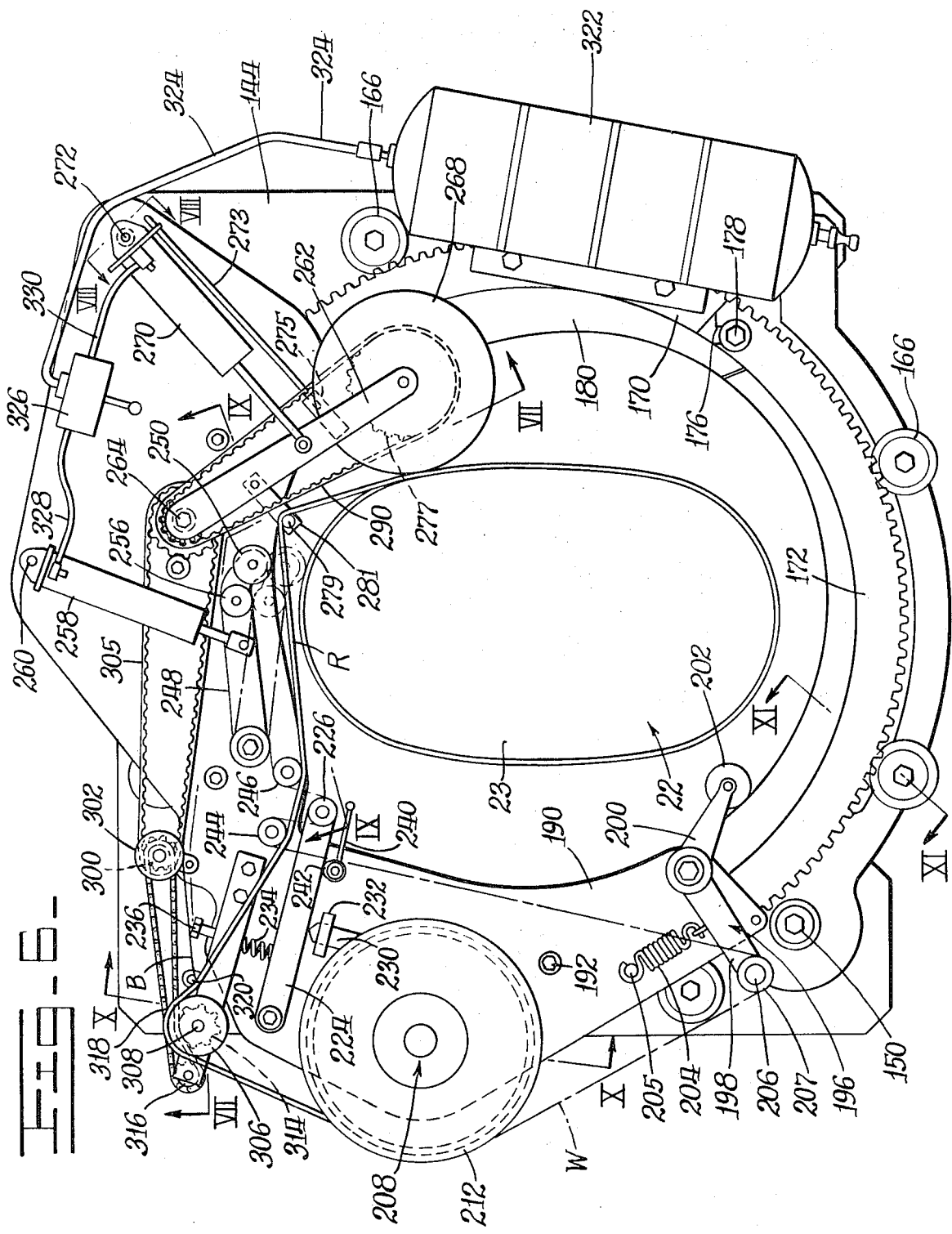

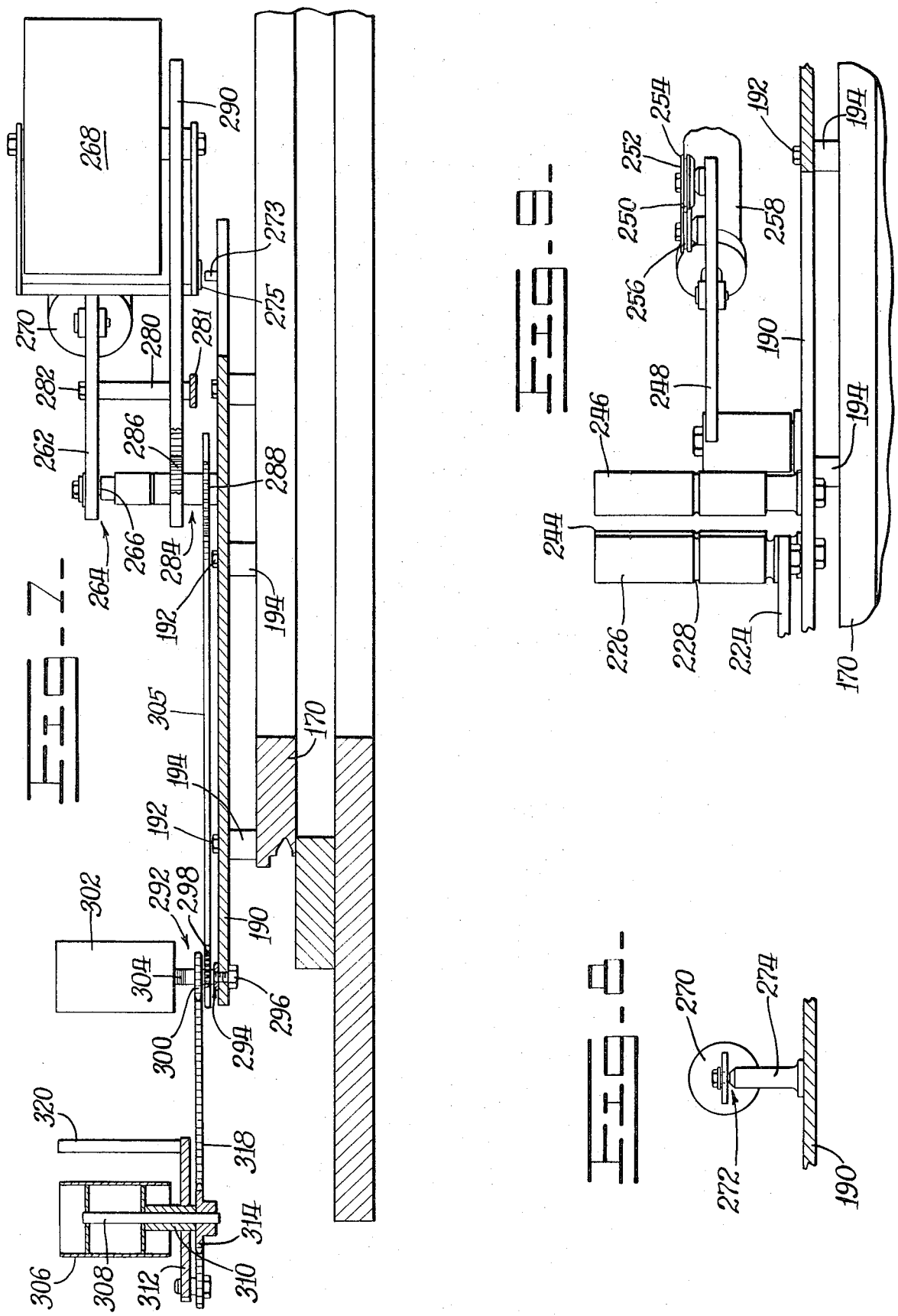

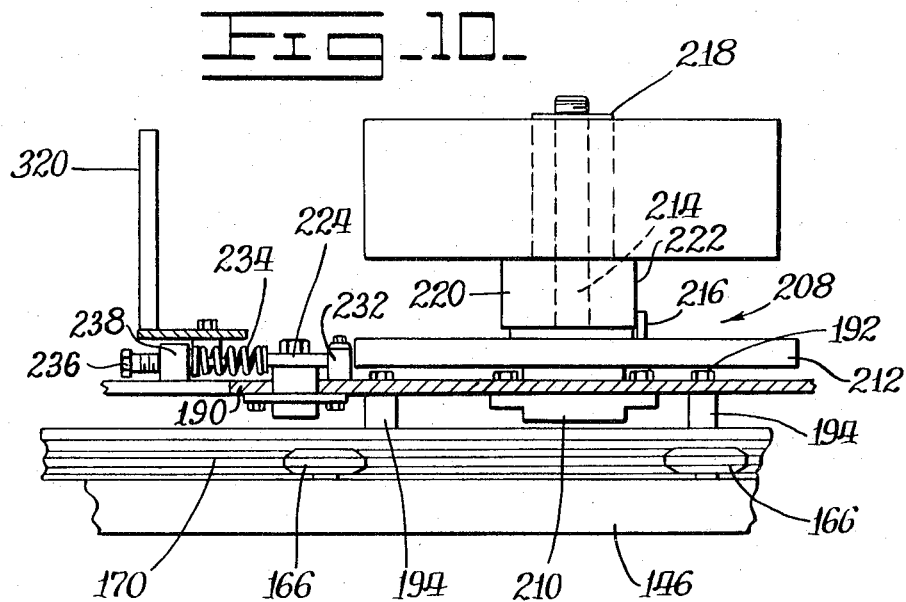
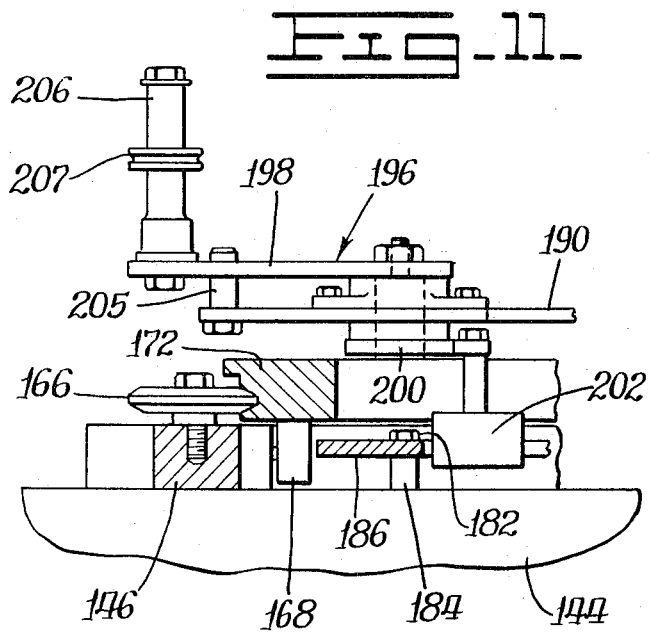

TIRE WRAPPING MACHINE

BACKGROUND OF THE INVENTION

This invention relates to winding apparatus, and more particularly, to apparatus for winding substantially inextensible or extensible material about the body of a toroidal member.

U.S. Pat. No. 3,606,921 issued to Grawey (assigned to the assignee of this application) discloses a novel oval pneumatic tube-tire. Such tire is generally constructed by forming an oval toroidal tube member of elastomer material on a disintegrable core, winding inextensible filament about the toroidal tube member, and applying further layers of material to form the final tube-tire as illustrated therein. The core is then disintegrated and removed from within the tube-tire.

Generally, in the manufacture of the conventional type tires described in that patent, a relatively large amount of hand labor is used. In the fabrication of such conventional tires, the tire is built on a cylindrical drum by laboriously wrapping plies of liner, rubberized reinforcing fabrics, cords or filaments to form a flat endless belt on the surface of the drum. It will be understood that improper application of such layers can lead to defects in the finalized tire, and also to a lack of uniformity in the tires. Thus, there is considerable need for improvement in uniformity of tires, as well as a need to improve reliability in the final tire product, both of which suggest the need for automatic processes of tire manufacture.

Of particular importance in the manufacture of the tire disclosed in U.S. Pat. No. 3,606,921 are the proper formation of the oval toroidal tube member on the disintegrable core, and the wrapping of filament material thereabout, particularly keeping in mind that the final form of tire is oval in cross-section. If the toroidal tube member is to be formed by wrapping elastomer material about the core, such elastomer material must obviously be applied in an extremely careful and controlled manner, so that the finally formed tube member has the desired characteristics. Likewise, the application of filament material about the tube member must be carefully controlled to provide proper placement and substantially even tensioning thereof, again keeping in mind the oval cross-section of the object about which the filament is being wound.

In addition, it is to be noted that if the tire to be formed in accordance with U.S. Pat. No. 3,606,921 is relatively large, the core about which such wrapping is to take place may be extremely heavy. Consequently, means associated with the wrapping apparatus for supporting such core must be extremely reliable and effective.

U.S. Pat. No. 3,245,853 to Reinhart discloses a method for making a pneumatic tire, such method involving the wrapping of tape and filament material about a toroidal member. However, no apparatus is disclosed therein for practicing such method. U.S. Pat. No. 1,213,600 to Dunkerley broad discloses apparatus for winding thread about an annular core. However, the apparatus disclosed is clearly not complete, and furthermore discloses only the wrapping of a core of circular cross-section. This reference therefore does not teach the wrapping of a toroidal object of oval cross-section, and the overcoming of the particular problems attendant thereto. Similar to this is U.S. Pat. No. 1,248,871 to Kremer. There also the wrapping apparatus is not shown as complete, and the disclosure thereof does not deal with the particular problems involved in wrapping a toroidal member of oval cross-section. Rather, the specification thereof discloses in very general terms the wrapping of fabric about a substantially circular core.

U.S. Pat. No. 3,458,146 to Warner discloses generally an apparatus for winding filament material about the surface of a toroidal member. However, there is no disclosure of means for dealing with the particular problems involved in applying filament winding under substantially even tension to the toroidal member, nor is there any disclosure at all of applying other than filament material (i.e., for example, elastomeric material) to such a toroidal member.

Furthermore, this reference discloses a roller and belt system for supporting the toroidal member with its mid-circumferential plane generally vertically disposed. However, such roller and belt system is generally and broadly disclosed and illustrated, and there is no discussion of having to deal with the special problems of handling an extremely heavy toroidal member.

U.S. Pat. No. 3,351,302 to Lang discloses apparatus for paying out and tensioning wire. However, such apparatus is not used in connection with a wrapping or winding system, and consequently does not deal with the problems attendant thereto, or the solutions thereof.

SUMMARY OF THE INVENTION

It is an object of this invention to provide apparatus for winding elongated extensible material about the body of a toroidal member, providing for proper placement and extension of such deposited elongated material on the surface of the toroidal member, taking into account the oval cross-sectional shape of the toroidal member.

It is a further object of this invention to provide apparatus which, while fulfilling the above object, is capable of winding filament material about the body of a toroidal member, meanwhile allowing for proper placement and tensioning of such filament material, in particular allowing for the oval cross-sectional shape of the toroidal members.

It is a still further object of this invention to provide an apparatus which, while fulfilling the above objects, is capable of properly supporting the toroidal member being wrapped, meanwhile allowing for the change in overall size of the toroidal member due to the wrapping of material thereon.

It is a still further object of this invention to provide apparatus which, while fulfilling the above objects, is relatively simple in design and extremely effective in operation.

Broadly stated, the invention comprises apparatus for winding flexible elongated material about the body of a toroidal member. Such apparatus comprises a base, and roller means associated with the base and on which the toroidal member is supported, the toroidal member being rollable about its axis on said roller means. Guide means are included for guiding the elongated material onto the surface of the toroidal member. Means are included for rotating the guide means about the body of the toroidal member to deposit the elongated material on the surface of the toroidal member. Means are included for providing relative motion between the guide means and the toroidal member about the axis of the toroidal member, whereby the elongated material is wound about the toroidal member. Further included are means interconnecting the base and roller means for providing continuous positive support of the toroidal member by the roller means while compensating for changing size of the toroidal member due to the winding of the elongated material thereon. In the winding of elongated flexible extensible material about the body of the toroidal member, means are included which are associated with the guide means for extending the extensible material to be deposited onto the surface of the toroidal member so that the deposited material is in an extended state. In the use of the apparatus for winding filament material about the body of the toroidal member, means are included for tensioning in a substantially constant and substantially continuous manner, the filament material being deposited onto the surface of the toroidal member.

BRIEF DESCRIPTION OF THE DRAWINGS

These and other objects of the invention will become apparent from a study of the following specification and drawings, in which:

FIG. 4 is a view taken along the line IV—IV of FIG. 1;

FIG. 5 is a sectional view taken along the line V—V of FIG. 4;

FIG. 6 is a view taken along the line VI—VI of FIG. 1;

FIG. 7 is a sectional view taken along the line VII—VII of FIG. 6;

FIG. 8 is a sectional view taken along the line VIII—VIII of FIG. 6;

FIG. 9 is a view taken along the line IX—IX of FIG. 6;

FIG. 10 is a sectional view taken along the line X—X of FIG. 6;

FIG. 11 is a sectional view taken along the line XI—XI of FIG. 6;

DESCRIPTION OF THE PREFERRED EMBODIMENT

Figure 1:
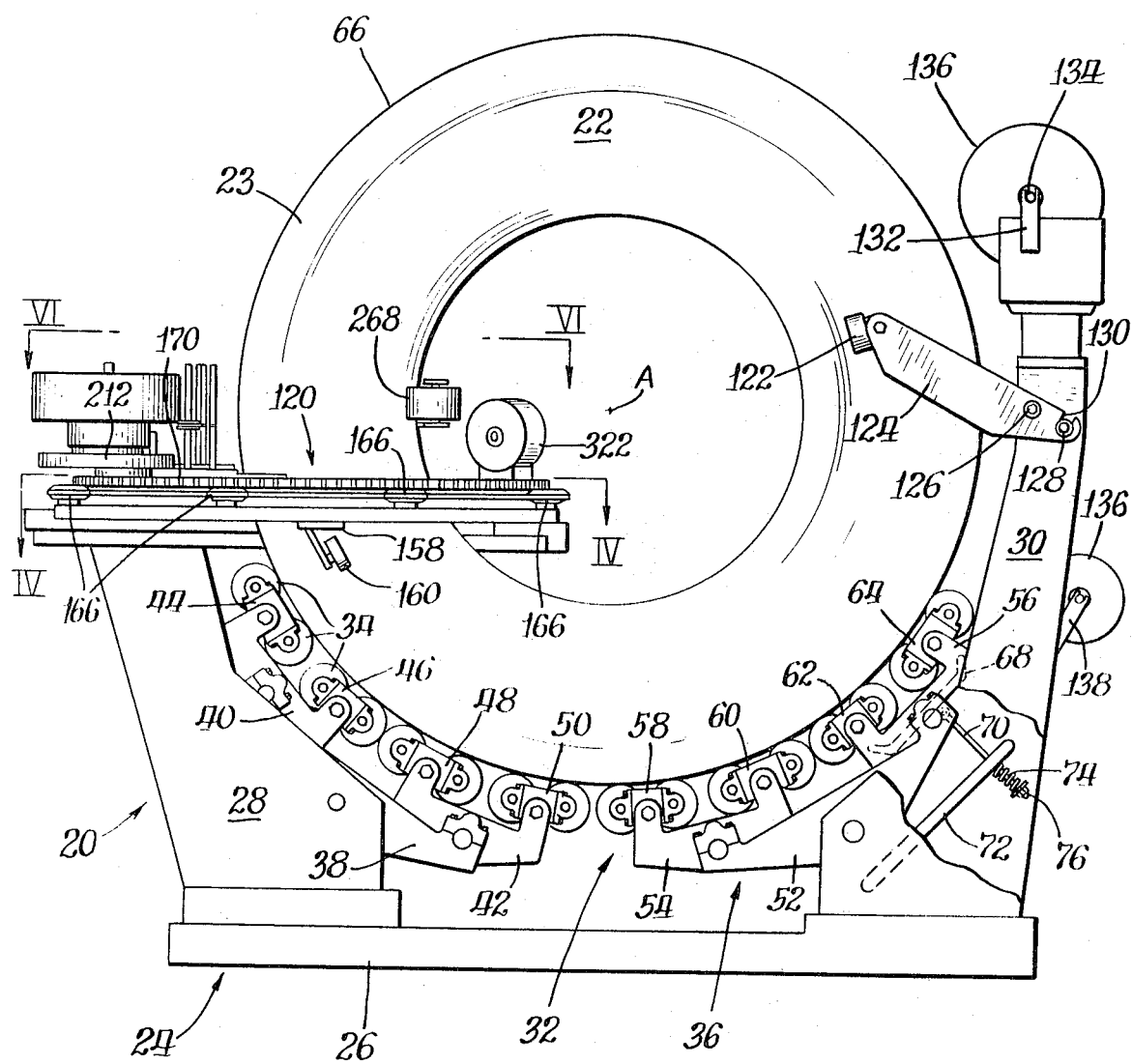
FIG. 1 is a side elevation of the apparatus.

Referring to FIG. 1 of the drawings, the inventive apparatus is shown at 20. Such apparatus 20 is in supporting relation with a rigid toroidal member 22, which in this particular use is a disintegrable sand core. The toroidal member 22 is substantially the size and configuration of the inner surface of a completed oval pneumatic tube-tire. The non-circular, or oval cross-section of the toroidal member 22 is best shown in FIG. 4.

The apparatus includes a base 24 made up of a lower base portion 26 and upwardly extending base portions 28, 30 fixed thereto. Roller means 32 are associated with the base 24 as shown. These roller means 32 are made up of a plurality of rollers 34, and means 36 associating the rollers 34 with the base 24. The means 36 comprise a primary bogey arm 38 pivotally mounted between its ends to the base portion 28, and a pair of additional bogey arms 40, 42, each pivotally mounted between its ends to an end of the primary bogey arm 38. Mounting blocks 44,46 are included, each mounting block being pivotally mounted between its ends to an end of the additional bogey arm 40. Likewise included are mounting blocks 48,50, each mounting block being pivotally mounted between its ends to an end of the additional bogey arm 42. It is understood that this structure is duplicated on the rear side of the apparatus (not shown). Each of these mounting blocks has a roller 34 mounted on each end thereof, and extending toward the rear of the apparatus 20, to be similarly associated with like mounting blocks there.

The means 36 likewise comprise a primary bogey arm 52 pivotally mounted between its ends to the base portion 30, and a pair of additional bogey arms 54,56 each pivotally mounted between its ends to an end of the bogey arm 52. Mounting blocks 58,60 are included, each mounting block being pivotally mounted between its ends to an end of the additional bogey arm 54. Likewise included are mounting blocks 62,64, each mounting block being pivotally mounted between its ends to an end of the additional bogey arm 56. Again, it is to be understood that this structure is duplicated on the rear side of the apparatus 20.

Each of these mounting blocks has a roller 34 mounted on each end thereof, and extending towards the rear of the apparatus 20, to be similarly associated with the like mounting blocks there.

The primary bogey arms 38,52 are disposed substantially end-to-end, as are the additional bogey arms 40,42, 54,56 and the toroidal member 22 is rollingly supported on the rollers 34. The toroidal member 22 is disposed with its mid-circumferential plane substantially vertical, and with its axis A substantially parallel to the axis of rotation of each roller 34, so that the toroidal member 22 is rollable about its axis A on the rollers 34, with the rollers 34 positioned about and generally under the toroidal member 22 in rolling contact with the outer periphery 66 of the toroidal member 22. In fact, in the preferred embodiment, the rollers 34 mounted to mounting blocks 44,46, 48,50 are positioned on one side of the center of gravity of the toroidal member 22, which lies along or close to the axis A of the toroidal member 22, and the rollers 34 mounted to the mounting blocks 58,60, 62,64 are positioned on the other, opposite side of the center of gravity of the toroidal member 22. Such positioning of the rollers 34 is chosen because the toroidal member 22 may in some cases be extremely heavy, and a relatively even distribution of load on the rollers 34, along with a stable carrying thereof, is desirable.

To aid in the achievement of proper load distribution, a plate 68 extends between the additional bogey arm and the corresponding rearward bogey arm, and is fixed thereto. The plate 68 has a rod 70 pivotally fixed thereto and extending through an anchor plate 72 integral with the base portion 30, in slidable relation with the anchor plate 72. A compensating spring 74 is disposed on the rod 70 between the plate 72 and a nut 76 which is threadably secured to the extended end of the rod 70. The compensating spring 74 urges the more heavily loaded rollers 34 (i.e., the lower rollers, which are close to the center of gravity of the toroidal member 22), inwardly of the outer periphery 66 of the toroidal member 22. In this way, relatively great inward forces is prevented from being exerted on the toroidal member 22 by the upper, outer rollers 34.

Like compensating spring structure is associated with the additional bogey arm 40 and the base portion 28.

As shown in FIG. 1, the rollers 34 are spaced about the outer periphery 66 of the toroidal member 22 in generally unequal intervals. Such staggered spacing insures that indentations in the outer periphery 66 of the toroidal member 22 formed by the weight thereof on the rollers 34 are not evenly spaced, so that relatively smooth and even movement of the toroidal member 22 over the rollers 34 is insured (i.e., if the spacing of the rollers 34 was substantially even, the indentations formed thereby in the toroidal member 22 would also be substantially even spaced, so that the toroidal member 22 would "bounce" as rolled over the rollers 34, and thus would not roll smoothly).

Figure 3:
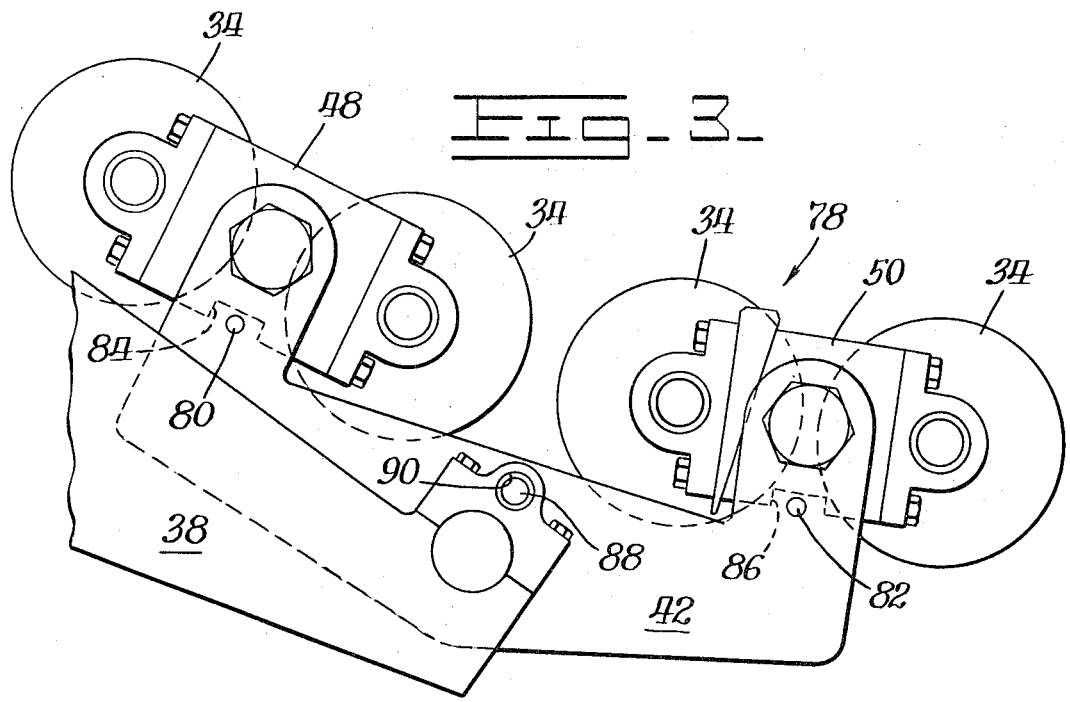
FIG. 3 is a side elevation of a portion of the bogey system of the apparatus.

In fact, the distance between any pair of rollers 34 mounted to a mounting block may be varied by means of a wedge system 78 (FIG. 3) which may be moved to vary such distance as shown. Consequently, spacing of the rollers 34 can be chosen and if necessary adjusted. As also shown in FIG. 3, pins 80, 82 are secured to the additional bogey arm 42, and extend inwardly into notches 84, 86 formed on the mounting blocks 48, 50 respectively to limit pivotal motion of the mounting blocks 48, 50 relative to said bogey arms. A pin 88 is secured to the additional bogey arm 42 and extends outwardly into a hole 90 provided in the primary bogey arm 38 to limit pivotal movement of the additional bogey arm 42 relative thereto. It will be understood that the other bogey arms and mounting blocks include similar movement-limiting structure.

It will be understood that, as the toroidal member 22 is rotated about its axis A over the rollers 34, and material is wrapped about the body 23 of the toroidal member, the overall size of the toroidal member 22 will change (i.e., will get larger). The bogey means 36 and roller means 32 described above compensate for such change of size through the pivoting of mounting blocks 44, 46, 48 50, 58 60, 62, 64, additional bogey arms 40, 42, 54, 56 and primary bogey arms 38, 52, meanwhile insuring that continuous positive support of the toroidal member 22 is provided.

Figure 2:
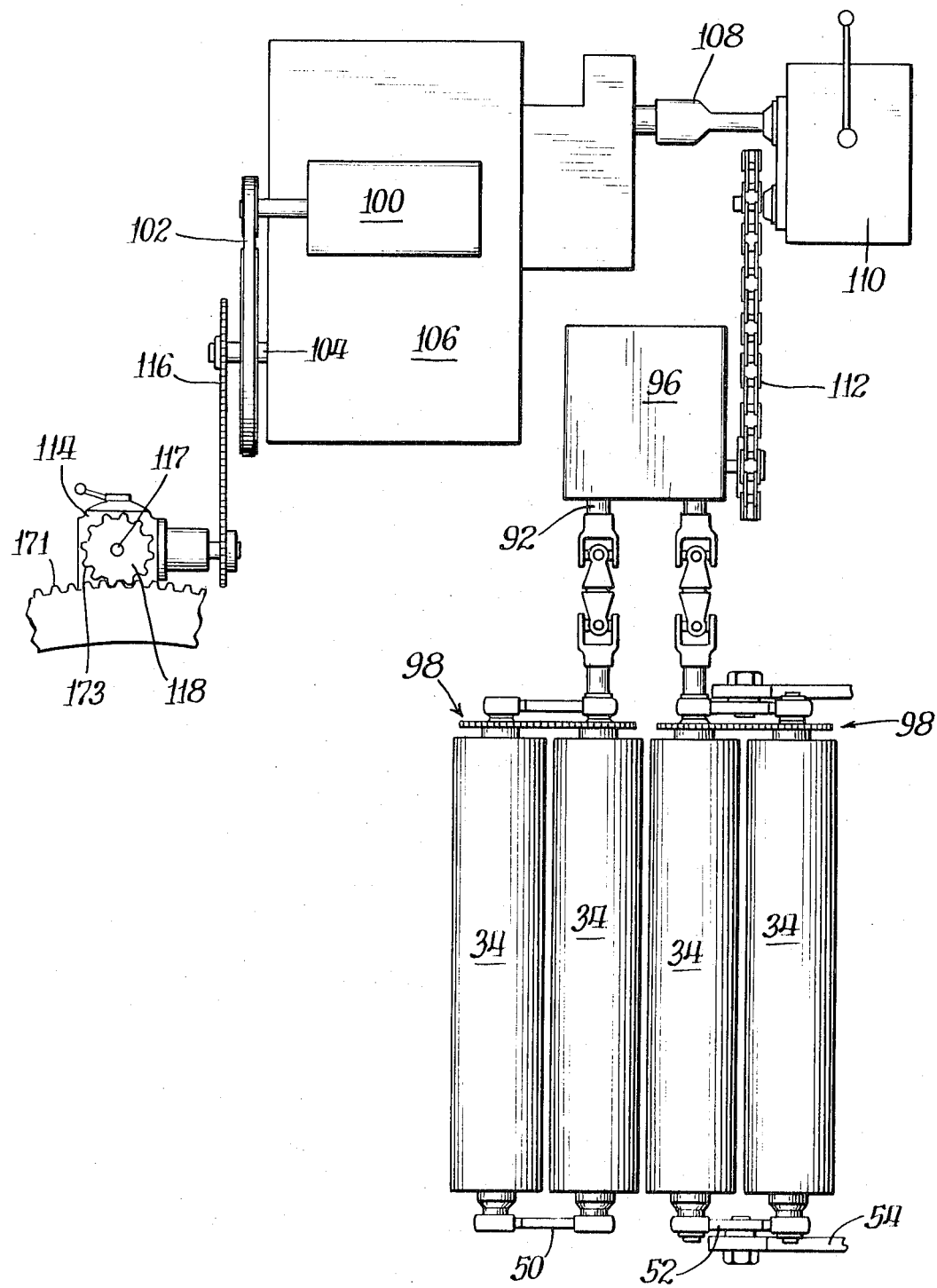
FIG. 2 is a plan view, with portions removed, of the drive means of the apparatus.

As shown in FIG. 2, a pair of drive shafts 92, 94 extend between the two centrally disposed rollers 34 and a gear box 96, so that both central rollers 34 may be driven at the same speed. Each of these centrally disposed rollers 34 is connected to an adjacent roller outwardly thereof through a chain and sprocket drive 98 so that the four lower rollers 34 as shown may be driven in unison. The gear box 96 receives its input power from a variable speed electric motor 100, through belt 102, input shaft 104, variable speed transmission 106, shaft 108, multi-speed transmission 110, and chain drive 112. A right angle drive reversible gear box 114 receives its input power through a chain and sprocket apparatus 116, which is connected to the shaft 104. An output shaft 117 extends upwardly from the gear box 114 and has a spur gear 118 secured to its upper end. The rotation of such spur gear 118 is utilized to rotate guide means 120 (FIG. 1) about the body 23 of the toroidal member 22, with such guide means 120 depositing material on the surface of the toroidal member 22, as will be described in detail. Meanwhile, rollers 34 are also rotated through the means disclosed, to rotate the toroidal member 22 about its axis A, so that relative motion between the guide means 120 and the toroidal member 22 about the axis A of the toroidal member 22 is provided.

Referring again to FIG. 1, a guide roller 122 is mounted on the extended end of a support arm 124 secured to the upper portion of the base portion 30 by bolts 126, 128. A notch 130 is formed in the arm 124 to receive the bolt 128. Loosening the bolts 126, 128 allows the support arm 124 to be pivoted clock-wise about the bolt 126 to a non-interfering position for insertion or removal of the toroidal member 22. A similar guide roller and support arm assembly, not shown, is secured to the rear side of the base portion 30.

A pair of spaced brackets (one shown at 132) are secured to the upper end of the base portion 30, with each bracket having a notch 134 formed therein for receiving a spool of material 136. A second pair of notched brackets (one shown at 138) are secured to the base portion 30 below the bolts 126, 128 to store extra spools 136 thereon.

The guide means 120 of above are best shown in FIGS. 1, 4 and 6. As shown therein, the apparatus 20 includes a horizontally disposed shuttle arrangement 142 mounted on a C-shaped upper portion 144 of the base portion 28, with the opening of the C-shaped portion 144 being oriented toward the front of the apparatus 20. A mounting structure 146 is fixed to the top of the C-shaped portion 144 and includes a gate 148 which is positioned to bridge the opening of the C-shaped portion 144. The gate 148 has one end pivotally secured to the C-shaped portion at a pivot 150, with the oppositely extending end having a notch 152 formed therein. The notch 152 terminates in a conically shaped indented surface. A bolt 154 and a conically shaped washer 156 are adapted to engage the notch 152 to releasably secure the gate 148 in the closed position across the opening of the C-shaped portion 144, with such conical surfaces cooperating to properly position the gate 148 in such closed position.

A bracket 158 is secured to the bottom surface of the gate 148 adjacent its pivotal end and carries a guide roller 160. A similar bracket 162 and guide roller 164 are suitably secured to the C-shaped portion 144 approximately 180°C from the support bracket 158. A plurality of rollers 166 are secured to the top of the mounting structure 146 and gate 148, and are uniformly spaced in a circular path. Each roller 166 has a substantially V-shaped periphery, and is horizontally disposed. A plurality of vertical rollers 168 are secured to and are uniformly spaced about the inside diameter of the mounting structure 146 and gate 148.

Supported on these vertical rollers 168 is a segmented shuttle ring gear 170. The ring gear 170 is positioned substantially horizontally, and has a V-shaped circumferential groove formed in its outer periphery adjacent the lower surface thereof. The V-shaped peripheries of the rollers 166 extend into the V-shaped groove in the ring gear 170, so that the ring gear 170 is rotatable about its axis in a substantially horizontal plane, and about the body 23 of the toroidal member 22 when the toroidal member 22 is positioned as shown in the drawings.

The ring gear 170 has a plurality of teeth 171 formed on its outer periphery above the V-shaped groove. The teeth 171 are in meshing engagement with the teeth 173 of the spur gear 118.

The ring gear 170 is provided with a gate 172 of approximately 90°. One end of the gate 172 is pivoted at 174 to the main section of the ring gear 170, with the opposite end of the gate 172 having a notch 176 formed therein to permit it to be releasably secured to the main section with a bolt and conical washer arrangement 178. A continuous cam 180, the function of which will be described in detail, is secured to the upper portion structure 144 by a plurality of bolts 182 and stand off spacers 184 to position the cam 180 elevationally between the upper portion 144 and the ring gear 170. A gate portion 186 of the cam 180 is mounted on the support bracket 158 and a bracket 188 which is secured to the gate 148 of the mounting structure 146. The cam 180 is thus fixed relative to the base 24.

As best shown in FIGS. 6 and 7, the guide means 120 include a substantially C-shaped support member 190 secured to and spaced above the ring gear 170 by a plurality of bolts 192 and spacers 194. One end of the support member 190 is disposed adjacent to the pivot 150. The support member 190 is rotatable about the axis of rotation of the ring gear 170 about the body 23 of the toroidal member 22.

As best shown in FIGS. 6 and 11, a lever assembly 196 is pivotally fixed to the support member 190 and has extending lever arms 198, 200. A cam roller 202 is rotatably fixed to the end of the lever arm 200, and is positioned to be in rolling contact with the cam 180. A resilient spring member 204 interconnects lever arm 198 and a post 205 fixed to support member 190, for keeping the roller 202 in such continuous rolling contact with the cam 180 as the lever assembly 196 moves with the support member 190. An upwardly extending post 206 is fixed to the end of the lever arm 198 and has a sheave 207 rotatably and slidably supported thereon. The entire cam follower assembly is movable generally with the support plate 190 (and guide means 120).

As most clearly shown in FIGS. 6 and 10, a reel support assembly 208 is mounted on the support member 190 by a suitable bearing arrangement 210 and is spaced diagonally rearwardly from the lever assembly 196. The reel support assembly 208 includes an annular brake plate 212 and an upwardly extending spindle 214 secured coaxially therewith. The spindle 214 acts as the axis of rotation of a supply reel associated with the apparatus 20, such axis of rotation being fixed relative to the support member 190. An upwardly projecting pin 216 is secured to the brake plate 212 and is spaced radially outwardly from the spindle 214. When mounting a supply reel of elongated flexible filament material such as wire cable onto the reel support assembly 208, a centrally disposed bore of the reel slips over the spindle 214, with the reel having an aperture disposed for engagement with the pin 216 to attach the reel to the brake plate 212 for unitary motion therewith. For mounting a reel of elongated flexible extensible material such as rubber material to the reel support assembly 208, an adapter 218 is positioned on the spindle 214 to receive the larger central bore of the rubber supply reel. The adapter 218 has a substantially annular spacer portion 220 supported by the brake plate 212. A flat surface 222 is formed on the periphery of the annular spacer portion 220 and is disposed adjacent to the pin 216 to prevent relative rotation between the adapter 218 and the brake plate 212.

A lever 224 is pivotally mounted to the support member 190 adjacent to and rearwardly of the reel support assembly 208. A sheave 226 is rotatably mounted to the extended end of the lever 224, and has a circumferential groove 228 formed in its periphery. A block of friction material 130 is disposed between the lever 224 and the brake plate 212, and is slidably secured to the support member 190 by a bracket 232. A resilient spring 234 is disposed between the back of the lever 224 and an adjustment bolt 236 extending through an anchor leg 238 secured to the mounting plate 190 to resiliently urge the lever 224 against the friction material 230 which is in turn urged against the periphery of the brake plate 212. A lever 240 having a cam portion 242 fixed thereto is pivotally secured to the support member 190 adjacent the lever 224. Rotating the lever 240 to the position shown in FIG. 6 compresses the spring 234 and releases the pressure on the friction material 230 to permit the brake plate 212 to rotate freely.

A pair of rollers 244, 246 are disposed rearwardly of and adjacent to the roller 226. These rollers 244, 246 are rotatably mounted on the top of the support member 190 in a vertical direction, with each roller having a circumferential groove formed in its inner periphery intermediate its ends.

As more clearly shown in FIGS. 6 and 9, a lever 248 is pivotally secured to the upper surface of the support member 190 adjacent the roller 246. A pulley 250 having a circumferential groove formed in its periphery is rotatably mounted on the extended end of the lever 248 for applying pressure against the surface of the toroidal member 22. A top surface 252 of pulley 250 is machined flat to provide a relatively thin flange 254 (approximately 0.010 inch) between the top surface 252 and the groove. (The thinness of the flange 254 is necessary because the surface 254 will lie adjacent to wire already wrapped on the toroidal member 22 and the adjacent radial turns of the wire may preferably be not more than 0.010 inch apart.) A second pulley 256 having a circumferential groove formed in its periphery is suitably rotatably mounted on the lever 248 adjacent to the pulley 250. An air-actuated cylinder 258 has its head end pivotally anchored at the top of a shaft 260 secured to the top of the support member 190 and its rod end pivotally attached to the lever 248 intermediate the pivot thereof and the pulley 250. The cylinder 258 functions to selectively apply pressure to the lever 248 to maintain the pulley 250 against the surface of the toroidal member 22 during the wire-wrapping operation.

As more clearly shown in FIGS. 6 and 7, a lever 262 has one end pivotally connected by a spherical connection 264 to the upper end of a vertical shaft 266 secured to the support member 190 adjacent to the pulley 250. A pneumatic pressure roller 268 is suitably rotatably mounted in the bifurcated end of the lever 262, with its axis of rotation being substantially normal to the support plate 190. The head end of an air cylinder 270 is connected through a spherical connection 272 to the top of a post 274 (FIG. 8), rigidly secured to the top of the support member 190. The rod end of the cylinder 270 is pivotally connected at a pivot to the lever 262 intermediate its ends for pivoting the lever 262 in a substantially horizontal plane to move the roller 268 into engagement with the surface of the toroidal member 22. A support bar 273 is rigidly secured to the top surface of the support member 190 and is adapted to engage a wear plate 275 secured to the lower surface of the bifurcated end of the lever 262 to support the lever 262 and roller 268 when they are retracted away from the toroidal member 22.

A sprocket 277 is suitably secured to the lower surface of the roller 268 for unitary rotation therewith. A vertically disposed post 279 is mounted on one end of a horizontally disposed support bar 281 which is disposed elevationally below the sprocket 277. The opposite end of the bar 281 is secured to a spacer 280 which is in turn secured to the bottom of the lever 262 by a bolt 282.

A compound sprocket 284 is rotatably mounted on the vertical shaft 266 and includes a first sprocket 286 disposed above a larger sprocket 288. The first sprocket 286 is substantially elevationally aligned with the sprocket 277 and is drivingly connected thereto by a toothed timing belt 290 which imparts rotary motion to the compound sprocket 284 when the roller 268 rotates during the rubber wrapping sequence.

A sprocket assembly 292 is spaced leftwardly from the compound sprocket 284 and is secured to a support lug 294 adjustably secured to the support member 190 by a bolt 296. The sprocket assembly 292 has a timing belt sprocket 298 and a chain sprocket 300 integrally formed thereon. A take-up reel 302 is operatively connected to the sprocket assembly 292 through a slip clutch arrangement 304. A second timing belt 305 extends between the sprocket 298 and the larger sprocket 288 of the compound sprocket 284 to impart rotary motion to the sprocket assembly 292 and the take-up reel 302. The above described sprockets are sized to provide a speed increase to the take-up reel 302 with the slip clutch arrangement 304 being effective to cause a constant force to be exerted on the material being wound on the take-up reel 302 regardless of the speed at which the sprocket assembly 292 is driven.

A guide spool 306 has a shaft 308 extending downwardly therefrom through a bearing 310 secured to an elongated support bar 312 which has one end rigidly secured to the support member 190 adjacent to the lever 224. A sprocket 314 is secured to the lower end of the shaft 308. An idler sprocket 316 is rotatably secured to the extended end of the support bar 312. A drive chain 318 extends between the idler sprocket 316 and the chain sprocket 300 of the sprocket assembly 292. The back side of the chain 318 engages the sprocket 314 secured to the guide spool 306. The sprockets are sized to rotate the guide spool 306 at a speed such that its peripheral speed is lower than the peripheral speed of the pressure roller 268 so that the rubber material being wrapped on the toroidal member 22 is stretched. An upwardly extending non-rotatable post 320 is secured to the support bar 312 adjacent to the guide spool 306.

An air tank 322 is secured to the upper surface of the ring gear 170. A conduit 324 extends from the air tank 322 to a control valve 326 secured to the support member 190 intermediate the head ends of the air cylinders 258, 270. Conduits 328, 330 extend from the control valve 326 to the air cylinders 258, 270 respectively. The control valve 326 is manually actuatable to a first position to connect the tank 322 to the air cylinder 270, to a second position to connect the tank 322 to the air cylinder 258, or to a neutral position blocking the tank 322 from both cylinders.

Figure 12:
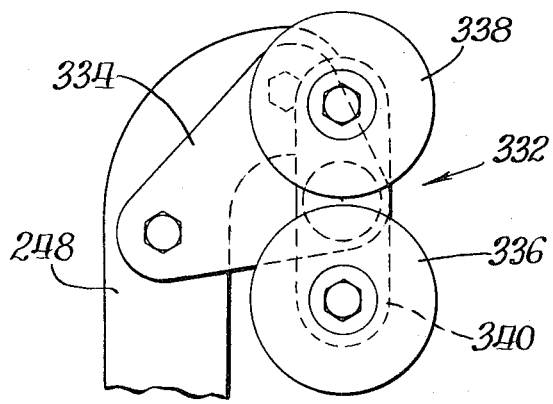
FIG. 12 is a plan view of a stitching mechanism which may be applied to the apparatus.
Figure 13:
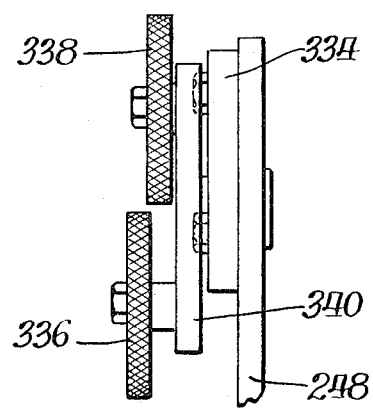
FIG. 13 is a side elevation of the stitching mechanism of FIG. 12.

Referring to FIGS. 12 and 13, a first stitching roller arrangement 332 includes a mounting bracket 334 which is replaceably mountable on the extended end of the lever 248 after the pulleys 250, 256 are first removed. A pair of rollers 336, 338, each having a knurled periphery, are rotatably mountable on the opposite ends of a bogey arm 340 which is centrally pivotally mounted to the bracket 334.

Figure 14:
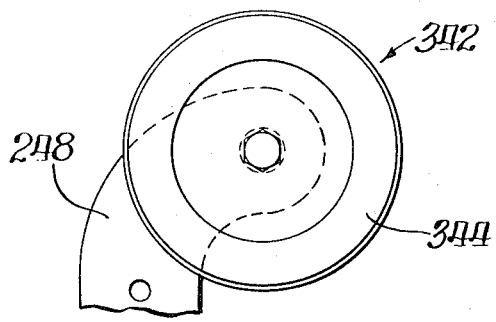
FIG. 14 is a plan view of another stitching mechanism which may be applied to the apparatus.
Figure 15:
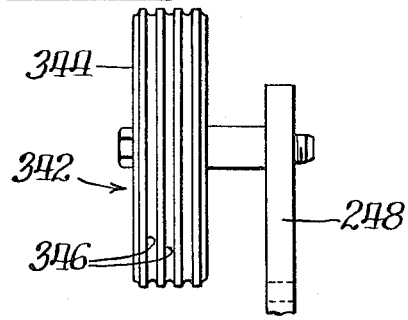
FIG. 15 is a side elevation of the stitching mechanism of FIG. 14.

As more clearly shown in FIGS. 14 and 15, a second stitching roller arrangement 342 includes a roller 344 rotatably secured to the extended end of the lever 248 in place of the pulleys 250, 256. The periphery of the roller 344 is provided with a plurality of circumferential grooves 346.

Alternately, the apparatus 20 could include a pair of shuttle arrangements, with one shuttle arrangement carrying only the wire wrapping apparatus while the other shuttle arrangement would carry only the rubber wrapping apparatus.

In the use of the apparatus 20, such apparatus 20 is prepared for receiving the toroidal member 22 (in this use, a sand core) by positioning the ring gear 170 of the shuttle arrangement 142 so that the gates described above are adjacent to each other. The bolts at 154, 178 are loosened and the gates 148, 172 are pivoted about their respective pivots to the open position shown in FIG. 4. The bolts 126, 128 fastening the guide roller support arm 124 in place on the base portion 30 are loosened and the support arm 124 pivoted clockwise about the bolt 126. The toroidal member 22 is then placed in an upright position against the rear guide rollers and upon the support rollers 34 with the shuttle arrangement 142 extending through the opening of the toroidal member 22. The mid-circumferential plane of the toroidal member 22 is positioned substantially vertically. The gates 148, 172 are then pivoted to the closed position so that the shuttle arrangement 142 completely encircles the body 23 of the toroidal member 22, the gates 148, 172 being fastened in place with their respective bolts. The guide roller support arm 124 is then pivoted to position the guide roller 122 against the toroidal member 22 and the arm 124 is releasably fixed by tightening the bolts 126, 128.

As described above, the four bottom rollers 34 and the shuttle ring gear 170 are driven by the variable speed electric motor 100 to sychronize the rotation of the toroidal member 22 supported on the support rollers 34 with the rotation of the ring gear 170. The speed of the ring gear 170 is dependent directly on the speed of the electric motor 100, while the speed of the rollers 34 can be varied by selective shifting of either of the transmissions 106, 110. Since the transmission 110 has a plurality of fixed speed ratios, and the transmission 106 has a variable speed output, the rollers 34 and the toroidal member 22 can be rotated at an infinite number of speeds to provide the desired percentage of overlap of rubber material deposited on the surface of the toroidal member 22 or the proper spacing between the windings of filament material as it is being wound about the body 23 of the toroidal member 22 and deposited on the surface thereof. The gear box 114 driving the shuttle ring gear 170 has forward, neutral, and reverse positions and may be shifted to the neutral to permit the rollers 34 to be driven independently of the ring gear 170. Such drive means make it possible to rotate the toroidal member 22 about its axis A at a substantially constant angular velocity, meanwhile rotating the support member 190 with the ring gear 170 about its axis of rotation at a substantially constant angular velocity. Although the toroidal member 22 is preferably rotated in a clock-wise direction, the electric motor 100 is reversible so that the toroidal member 22 can be rotated in a counter-clockwise direction also. However, the shuttle ring gear 170 is usually rotated in the counter-clockwise direction as viewed in FIG. 6, and when the electric motor 100 is reversed, the gear box 114 is shifted to the reverse position to obtain such counter-clockwise rotation of the ring gear 170.

The winding of elongated flexible extensible material such as rubber about the body of the toroidal member 22 is initiated by placing the adapter 218 onto the spindle 214 of the reel support assembly 208 for receiving a supply reel of rubber material. The lever 240 and cam 242 are pivoted to the position shown in FIG. 6 to release the frictional drag of the friction material 230 against the brake plate 212. As also shown in FIG. 6, the rubber material indicated by the letter R is threaded about the back side of the guide spool 306, in substantially non-sliding contact with the periphery of the guide spool 306. The rubber material then extends between the guide spool 306 and the post 320, in front of the rollers 244, 246 and behind the post 279, with the end then being adhesively secured to the surface of the toroidal member 22. The air cylinder 270 is then actuated by manual manipulation of the control valve 326 to move the roller 268 against the rubber material, pressing it against the toroidal member 22. The roller 268 is positioned to contact and roll over the layer of extensible material just deposited on the surface of the toroidal member 22 to squeeze out undesirable air bubbles that may be formed in the overlapped edges of the rubber material. The periphery of the roller 268 is relatively soft so that it will envelope the overlaps of the rubber material to insure contact with the full width of the rubber material being applied.

The successive layers of rubber material on the supply reel are separated by a continuous elongated flexible plastic backing, indicated by the letter B (FIG. 6), to prevent the rubber from sticking together on the reel. The rubber material and backing are removably attached to each other, and are fed together from the supply reel about the periphery of the guide spool 306, and about the post 320. The end of the backing is separated from the rubber material beyond the post 320, and the backing material is extended therefrom onto and about the periphery of the take-up reel 302.

The axis of rotation of the guide spool 306 is fixed relative to the support member 190, so that the axis of rotation of the guide spool 306 is itself rotatable about the body 23 of the toroidal member 22 with the support member 190. Likewise, the axis of rotation of the take-up reel 302 is fixed relative to the support member 190, so that the axis of rotation of the take-up reel 302 is itself rotatable about the body 23 of the toroidal member with the support member 190 and with the axis of rotation of the guide spool 306.

As the support member 190 rotates about the body 23 of the toroidal member 22, the guide means 120 act to guide the rubber material onto the surface of the toroidal member 22 whereby the rubber material is deposited on the surface of the toroidal member 22.

The axis of rotation of the roller 268 is itself rotatable about the body 23 of the toroidal member generally along with the axis of rotation of the guide spool 306.

As the ring gear 170 is rotated about the oval section of the toroidal member 22, the rubber material is payed out from the supply reel and wound about the body 23. The toroidal member 22 is being revolved as the ring gear 170 rotates so that the rubber material is helically wrapped about the toroidal member 22 in overlapped relation to the previous turns. The control valve 326 is maintained in actuated position to maintain constant pressure on the air cylinder 270 while allowing it to extend and retract as the pressure roller 268 follows the oval shape of the toroidal member 22. The roller 268, being pressed against the surface of the toroidal member 22 and rubber material deposited thereon, rotates generally along with the ring gear 170, the cylinder 270 providing relatively great force to press the roller 268 against the deposited rubber material.

It will be understood that, with a constant rate of rotation of the support member 190, the rate of rotation of the roller 268 about its own axis of rotation will vary because of the non-circular or oval shape of the cross-section of the toroidal member 22. Through the belt-and-sprocket means described above, the peripheral speed of the guide spool 306 is less than and directly proportional to the peripheral speed of the roller 268. This insures that, in the manner of operation just described, the rubber material is continuously and substantially uniformly extended so that the deposited material is in a substantially uniformly-extended state, such extension taking place in a substantially constant amount and in a substantially continous manner between the guide spool 306 and the area of deposit of the rubber material onto the surface of the toroidal member 22. It will be seen that the roller 268, therefore, serves the additional purpose of being sensing means for insuring such substantially constant extension of the rubber material being deposited.

The belt and sprocket means described also rotate the take-up reel 302 at a peripheral speed greater than the guide spool 306 to insure tensioning of the backing as it is taken up. The clutch means 304 associated with the take-up reel 302 allow a degree of slippage thereof under the tensioning of the backing placed thereon, to avoid overtensioning of the backing. Such variations of the peripheral speed of the take-up reel 302 and the guide spool 306 are proper in relation to the oval cross-section of the toroidal member 22, because of the sensing roller 268 which is in continuous rolling contact with the surface of the toroidal member 22.

After the rubber wrap sequence has been completed and the ring gear 170 stopped, the control valve 326 is shifted to the neutral position and the lever 262 and roller 268 are spring returned to their non-operational positions.

The operation of winding flexible elongated filament material such as wire about the body 23 of the toroidal member 22 is initiated by placing a supply reel of wire on the spindle 214, with the pin 216 extending into an aperture in the reel to lock the reel to the brake plate 212. The lever 240 is pivoted clockwise about its pivot so that the spring 234 resiliently urges the lever 224 against the friction material 230 which is, in turn, urged into frictional contact with the brake plate 212. As shown in phantom in FIG. 6, the wire indicated by the letter W is threaded from the supply reel forwardly about the sheave 207 associated with the lever arm 198, rearwardly from the sheave 207 and around the sheave 244, forwardly around the sheave 226 on the lever 224, rearwardly about the sheave 246, behind the pulley 256 on the lever 248, between the pulleys 256, 250 on the extending end of the lever 248, and between the pulley 250 and the surface of the toroidal member 22. One revolution of wire is manually wrapped around the body 23 with the end being secured to the adjacent wire with a clip. The control valve 326 is actuated to direct air to the air cylinder 258 which extends to pivot the lever 248 so that the pulley 250 presses wire against the layer of rubber previously wrapped about the toroidal member 22. As the ring gear 170 is rotated about the body 23 of the toroidal member 22, the wire is wound about the body of the toroidal member 22 generally in a quasi-radial plane which is substantially normal to the mid-circumferential plane of the toroidal member 22. Tensioning of the wire is provided by the frictional drag of the friction material 230 against the brake plate 212. Should the tension in the wire become too great, the spring 234 will be compressed by the action of the wire on the lever 224, thereby lessening the braking force between the frictional material 230 and the brake plate 212 to allow the supply reel to more freely pay out the wire. Conversely, if the wire tension is too low, the spring 234 will exert a greater force on the lever 224 to increase the braking force on the brake plate 212, to resist to an extent the paying out of the wire from the supply.

The cam 180 and lever assembly 196 aid in keeping proper tension in the wire and compensate for the oval shape of the toroidal member 22. As the ring gear 170 rotates around the oval section of the toroidal member 22, the post 206 and sheave 207 move toward and away from the reel support assembly 208 in synchronization with the oval shape of the toroidal member 22 in response to the roller 202 rolling along the cam 180. It will be understood that the particular shape of the cam 180 is chosen in relation to the particular shape of the cross-section of the toroidal member 22 being wrapped. The sheave 207 is free to move up or down relative to the lever assembly 196 to guide and tension the wire regardless of whether it is being payed out from the top, bottom, or intermediate portion of the supply reel.

Through the means described, substantially constant tensioning of the wire being supplied to the surface of the toroidal member 22 is achieved in a substantially continuous manner.

The stitching apparatus utilizes the lever 248 and air cylinder 258 of the wire wrapping apparatus. The pulleys 250, 256 are replaced with either the first stitching roller arrangement 332 or the second stitch roller arrangement 342. To roll or stitch the upper layers or overlapped edges of rubber together, the air cylinder 258 is actuated to pivot the lever 248 to urge the stitching rollers 336, 338 against the rubber material previously applied to the toroidal member 22. The ring gear 170 is then revolved about the body 23 of the toroidal member 22 as the toroidal member 22 is rotated, similar to the previously described wrapping procedure, so that the stitching rollers 336, 338 follow a helical path about the body 23 of the toroidal member 22. After applying a layer of wire as described above, and then another layer of rubber, the stitching roller arrangement 342 may be applied to stitch the rubber material together, the grooves 346 of the roller 344 being provided so that the projections between these grooves 346 squeeze the rubber down between the wire turns to eliminate air pockets.

What is claimed is:

1. Apparatus for winding flexible elongated material about the body of a toroidal member comprising:
   a base;
   roller means associated with the base for supporting the toroidal member, the toroidal member being rollable about its axis on said roller means;
   guide means for guiding the elongated material onto the surface of the toroidal member;
   means for rotating the guide means about the body of the toroidal member to deposit the elongated material on the surface of the toroidal member;
   means for providing relative motion between the guide means and the toroidal member about the axis of the toroidal member, whereby the elongated material is wound about the toroidal member, and
   means interconnecting the base and roller means for providing continuous positive support of the toroidal member by the roller means while compensating for changing size of the toroidal member due to the winding of the elongated material thereon.

2. The apparatus of claim 1 wherein the toroidal member is supported with the mid-circumferential plane thereof substantially vertical, and wherein the means interconnecting the base and roller means comprise bogey means pivotally fixed relative to the base.

3. The apparatus of claim 2 wherein the bogey means comprise first and second primary bogey arms pivotally fixed between their respective ends relative to the base and disposed generally end-to-end.

4. The apparatus of claim 3 wherein the roller means comprise a plurality of rollers, and wherein the bogey means further comprise (i) first and second additional bogey arms, each pivotally mounted between its ends to an end of the first primary bogey arms, and third and fourth additional bogey arms, each pivotally mounted between its ends to an end of the second primary bogey arm, and (ii) first and second mounting blocks, each pivotally mounted between its ends to an end of the first additional bogey arm, the first mounting block having a roller mounted on each end thereof, the second mounting block having a roller mounted on each end thereof, third and fourth mounting blocks, each pivotally mounted between its ends to an end of the second additional bogey arm, the third mounting block having a roller mounted on each end thereof, the fourth mounting block having a roller mounted on each end thereof, fifth and sixth mounting blocks, each pivotally mounted between its ends to an end of the third additional bogey arm, the fifth mounting block having a roller mounted on each end thereof, the sixth mounting block having a roller mounted on each end thereof, and seventh and eighth mounting blocks, each pivotally mounted between its ends to an end of the fourth additional bogey arm, the seventh mounting block having a roller mounted on each end thereof, the eighth mounting block having a roller mounted on each end thereof.

5. The apparatus of claim 4 wherein the rollers are positioned about and generally under the toroidal member in contact with the outer periphery thereof.

6. The apparatus of claim 5 wherein the rollers are spaced about the outer periphery of the toroidal member in generally unequal intervals.

7. The apparatus of claim 5 and means for selectively varying the distance between the pair of rollers mounted to any mounting block.

8. The apparatus of claim 6 wherein the bogey arms, mounting blocks, and rollers are positioned so that, with the toroidal member supported thereon, the rollers mounted to the first, second, third and fourth mounting blocks are positioned on one side of the center of gravity of the toroidal member, and the rollers mounted to the fifth, sixth, seventh and eighth mounting blocks are positioned on the other side of the center of gravity of the toroidal member.

9. The apparatus of claim 8 wherein the means for providing relative motion between the guide means and the toroidal member about the axis of the toroidal member comprise drive means for rotating at least one roller, the rotation of said roller rotating the toroidal member about its axis relative to the base.

10. The apparatus of claim 9 and means associated with each primary bogey arm for urging the more heavily loaded rollers associated with that bogey arm inwardly of the outer periphery of the toroidal member.

11. The apparatus of claim 10 wherein the means for urging the more heavily loaded rollers inwardly of the outer periphery of the toroidal member comprise a helical spring member associated with each primary bogey arm and the base.

12. The apparatus of claim 1 wherein the roller means comprise a plurality of rollers positioned about and generally under the toroidal member in rolling contact with the toroidal member.

13. The apparatus of claim 12 wherein the rollers are spaced about the toroidal member is generally unequal intervals.

14. The apparatus of claim 12 and means for selectively varying the distance between at least one pair of adjacent rollers.

15. The apparatus of claim 14 wherein the means for providing relative motion between the guide means and the toroidal member about the axis of the toroidal member comprise drive means for rotating at least one roller, the rotation of said roller rotating the toroidal member about its axis relative to the base.

16. Apparatus for winding elongated flexible extensible material about the body of a toroidal member comprising:
 a base;
 means associated with the base for supporting the toroidal member;
 guide means for guiding the extensible material onto the surface of the toroidal member;
 means for rotating the guide means about the body of the toroidal member to deposit the extensible material on the surface of the toroidal member;
 means associated with the guide means for extending the extensible material to be deposited onto the surface of the toroidal member so that the deposited material is in an extended state; and
 means for providing relative motion between the guide means and the toroidal member about the axis of the toroidal member, whereby the extensible material is wound about the toroidal member.

17. The apparatus of claim 16 wherein the means associated with the guide means for extending the extensible material comprise means for extending the extensible material continuously and substantially uniformly so that the deposited material is in a substantially uniformly-extended state.

18. The apparatus of claim 17 wherein the body of the toroidal member is of non-circular cross section.

19. The apparatus of claim 18 wherein the guide means comprise a rotatable guide spool, the axis of rotation of the guide spool being itself rotatable about the body of the toroidal member, the extensible material being disposable about and in substantially non-sliding contact with the periphery of the rotatable guide spool and then extending onto the surface of the toroidal member, and wherein the means associated with the guide means for extending the extensible material comprise sensing means associated with the guide means for varying the peripheral speed of the guide spool in relation to the non-circular cross-section of the body of the toroidal member, to provide that the extensible material is extended a substantially constant amount continuously between the guide spool and the area of deposit of the elongated extensible member on the surface of the toroidal member.

20. The apparatus of claim 19 wherein the sensing means comprise a sensing roller in continuous rolling contact with the surface of the toroidal member, the axis of rotation of the sensing roller being itself rotatable about the body of the toroidal member generally with the axis of rotation of the guide spool, and means interconnecting the sensing roller and guide spool for rotating the guide spool at a peripheral speed lower than and directly proportional to the peripheral speed of the sensing roller.

21. The apparatus of claim 20 wherein the sensing roller is positioned to contact and roll over the layer of extensible material just deposited on the surface of the toroidal member, and further comprising means for providing relatively great force of the sensing roller against said deposited extensible material.

22. The apparatus of claim 21 wherein the means for providing said relatively great force comprise cylinder means operatively connected with the sensing roller and a fluid pressure source for selectively operating said cylinder means to urge the sensing roller against the surface of the toroidal member.

23. The apparatus of claim 22 wherein the toroidal member body is of oval cross-section.

24. Apparatus for wrapping elongated flexible extensible material about the body of a toroidal member comprising;
 a base;
 means associated with the base for supporting the toroidal member;
 a support member positioned relative to the base and rotatable about an axis about the body of the toroidal member;
 means for rotating the toroidal member about its axis at a substantially constant angular velocity;
 means for rotating the support member about its axis of rotation at a substantially constant angular velocity;
 a rotatable guide spool the axis of rotation of which is fixed relative to the support member, so that said axis of rotation of the guide spool is itself rotatable about the body of the toroidal member with the support member;

mounting means associated with the support member and on which elongated flexible extensible material supply means may be mounted;

the extensible material being feedable from the supply means about the periphery of the guide spool in substantially non-sliding contact therewith and then extending onto the surface of the toroidal member; and means associated with the support member for extending the extensible material before it is deposited onto the surface of the toroidal member so that the deposited material is in an extended state.

25. The apparatus of claim 24 wherein the toroidal member body is of oval cross-section.

26. The apparatus of claim 25 wherein the means associated with the support member for extending the extensible material comprise means for extending the extensible material continuously and substantially uniformly so that the deposited material is in a substantially uniformly-extended state.

27. The apparatus of claim 26 wherein the means associated with the support member for extending the elongated extensible material comprise sensing means associated with the support member for varying the peripheral speed of the guide spool in relation to the oval cross-section of the toroidal member, to provide that the extensible material is extended a substantially constant amount continuously between the guide spool and the area of deposit of the extensible material on the surface of the toroidal member.

28. The apparatus of claim 27 wherein the sensing means comprise a sensing roller in continuous rolling contact with the surface of the toroidal member and associated with the support member so that the axis of rotation of the sensing roller is itself rotatable about the body of the toroidal member generally with the support member, and means interconnecting the sensing roller and guide spool for rotating the guide spool at a peripheral speed lower than and directly proportional to the peripheral speed of the sensing roller.

29. The apparatus of claim 28 wherein the means interconnecting the sensing roller and guide spool comprise belt and sprocket means.

30. The apparatus of claim 29 wherein the toroidal member is supported with its mid-circumferential plane substantially vertical, and wherein the support member is rotatable relative to the base in a substantially horizontal plane.

31. Apparatus for separating flexible elongated material from a continuous elongated flexible backing thereof and winding said elongated material about the body of a toroidal member comprising:

a base;

means associated with the base for supporting the toroidal member;

a support member positioned relative to the base and rotatable about an axis about the body of the toroidal member;

means for rotating the toroidal member about its axis at a substantially constant angular velocity;

means for rotating the support member about its axis of rotation at a substantially constant angular velocity;

a rotatable guide spool the axis of rotation of which is fixed relative to the support member so that said axis of rotation of the guide spool is itself rotatable about the body of the toroidal member with the support member;

mounting means associated with the support member and on which elongated material-and-backing supply means may be mounted, the elongated material and backing being removably attached to each other;

the elongated material and backing being together feedable from the supply means about the periphery of the guide spool in substantially non-slipping contact therewith, with the elongated material extending onto the surface of the toroidal member;

a rotatable take-up spool the axis of rotation of which is fixed relative to the support member, so that said axis of rotation of the take-up spool is itself rotatable about the body of the toroidal member with the support member and with the axis of rotation of the guide spool;

the backing being separated from the elongated material after the elongated material and backing are disposed about the guide spool, the backing extending therefrom onto and about the periphery of the take-up spool;

means associated with the support member for rotating the take-up spool at a peripheral speed greater than the peripheral speed of the guide spool to insure tensioning of the backing as it is taken up; and clutch means associated with the take-up spool for allowing a degree of slippage thereof under the tensioning of the backing placed thereon to avoid over-tensioning of said backing.

32. The apparatus of claim 31 wherein the elongated material comprises elongated extensible material, and further comprising means associated with the support member for extending the elongated extensible material before it is deposited onto the surface of the toroidal member so that the material deposited thereon is in an extended state.

33. The apparatus of claim 32 wherein the toroidal member body is of oval cross-section.

34. The apparatus of claim 33 wherein the means associated with the support member for extending said elongated extensible material and for rotating said take-up spool comprise sensing means associated with the support member (i) for varying the peripheral speed of the guide spool in relation to the oval cross-section of the toroidal member, to provide that the elongated extensible material is extended a substantially constant amount continuously between the guide spool and the area of deposit of the elongated extensible material on the surface of the toroidal member, and (ii) for varying the peripheral speed of the take-up spool in relation to the oval cross-section of the toroidal member to provide proper tensioning of the member as it is taken up.

35. The apparatus of claim 34 wherein the sensing means comprise a sensing roller in continuous rolling contact with the surface of the toroidal member and associated with the support member so that the axis of rotation of the sensing roller is itself rotatable about the body of the toroidal member generally with the support member, and means interconnecting the sensing roller and guide spool for rotating the guide spool at a peripheral speed lower than and directly proportional to the peripheral speed of the sensing roller.

36. The apparatus of claim 35 wherein the sensing roller is positioned to contact and pass over the layer of elongated extensible material just deposited on the surface of the toroidal member, and further comprising means for providing relatively great force of the sensing roller against said deposited elongated extensible material.

37. The apparatus of claim 36 wherein the means for providing relatively great force comprise cylinder means operatively connected with the sensing roller, and a fluid pressure source for selectively operating said cylinder means to urge the sensing roller against the surface of the toroidal member.

38. The apparatus of claim 37 wherein the toroidal member is supported with its mid-circumferential plane substantially vertical, and wherein the support member is rotatable relative to the base in a substantially horizontal plane.

39. Apparatus for winding flexible elongated material from a supply about the body of a toroidal member comprising:
- a base;
- means associated with the base for supporting the toroidal member;
- guide means for guiding the elongated material onto the surface of the toroidal member;
- means for rotating the guide means about the body of the toroidal member to deposit the elongated material on the surface of the toroidal member;
- means associated with the guide means for tensioning the elongated material being deposited onto the surface of the toroidal member; and
- means for providing relative motion between the guide means and the toroidal member about the axis of the toroidal member, whereby the elongated material is wound about the body of the toroidal member.

40. The apparatus of claim 39 wherein the elongated material comprises filament material.

41. The apparatus of claim 40 wherein the means associated with the guide means for tensioning the filament material comprise means for tensioning the filament material substantially constantly in a substantially continuous manner.

42. The apparatus of claim 41 wherein the means associated with the guide means for tensioning the elongated material comprise brake means associated with the filament material supply for resisting to an extent the paying out of the filament material from said supply.

43. The apparatus of claim 42 wherein the means associated with the guide means for tensioning the filament material further comprise a sheave generally movable with the guide means and about which the filament material is wound between the supply and the toroidal member, and resilient spring means for urging the sheave in a direction to provide tensioning of the filament material between the supply and the surface of the toroidal member.

44. The apparatus of claim 42 wherein the toroidal member body of non-circular cross-section, and wherein the means associated with the guide means for tensioning the filament material further comprise cam means fixed relative to the base, and cam follower means associated with the guide means and generally movable therewith, and adapted to follow the cam means as the guide means rotate about the body of the toroidal member, the filament material being associated with the cam follower means between the supply and the surface of the toroidal member, the cam means being shaped in relation to the cross-sectional shape of the toroidal member to provide, with the brake means, substantially constant tensioning of filament material from the supply reel to the surface of the toroidal member in a substantially continuous manner.

45. The apparatus of claim 44 wherein the toroidal member body is of oval cross-section.

46. Apparatus for winding flexible filament material from a supply reel thereof about the body of a toroidal member comprising:
- a base;
- means associated with the base for supporting the toroidal member;
- a support member positioned relative to the base and rotatable about an axis about the body of the toroidal member;
- means for rotating the toroidal member about its axis at a substantially constant angular velocity;
- means for rotating the support member about its axis of rotation at a substantially constant angular velocity;
- the supply reel being mounted so that its axis of rotation is fixed relative to the support member, so that the supply reel itself moves with the support member;
- the filament material being feedable from the supply reel onto the surface of the toroidal member; and
- brake means associated with the support member and supply reel for resisting to an extent the paying out of other filament material from the supply reel, to tension the filament material deposited on the surface of the toroidal member.

47. The apparatus of claim 46 and further comprising a lever pivotally mounted to the support member, resilient spring means associated with the lever and support member, and a sheave rotatably mounted to the extending end of the lever and about which the filament material is wound between the supply reel and the toroidal member, the lever and resilient spring means being positioned so that the resilient spring means urge the lever and sheave in a direction relative to the support member to provide tensioning of the filament material between the supply reel and the toroidal member.

48. The apparatus of claim 47 and means associated with the lever and brake means so that upon tensioning of the filament material beyond a certain point, the brake means are released to an extent to allow the supply reel to more freely pay out the filament material.

49. The apparatus of claim 48 wherein the toroidal member is of non-circular cross-section, and further comprising a cam fixed relative to the base, a lever assembly pivotally fixed to the support member and having first and second extending lever arms, a cam roller rotatably fixed to the end of the first lever arm and in rolling contact with the cam, a second sheave rotatably fixed to the end of the second lever arm, and a resilient spring means for keeping the cam roller in continuous rolling contact with the cam, the filament material being wound about the second sheave from the supply reel, about the first-mentioned sheave, and then extending to the surface of the toroidal member, the cam being shaped in relation to the cross-sectional shape of the toroidal member to provide with the brake means and first sheave substantially constant tensioning of the filament material from the supply reel to the surface of the toroidal member, in a substantially continuous manner.

50. The apparatus of claim 49 wherein the toroidal member body is of oval cross-section.

51. Apparatus for rolling resilient material disposed about the body of a toroidal member comprising:

a base;

means associated with the base for supporting the toroidal member and resilient material disposed thereabout;

guide means rotatable about the body of the toroidal member;

means for providing relative motion between the guide means and the toroidal member about the axis of the toroidal member;

roller means associated with the guide means and movable therewith about the body of the toroidal member; and means for holding the roller means in continuous rolling contact with the resilient material disposed about the body of the toroidal member.

52. The apparatus of claim 51 wherein the roller means comprise a single roller associated with the guide means and defining a plurality of circumferential grooves.

53. The apparatus of claim 51 wherein the roller means comprise a pair of rollers associated with the guide means, each roller defining a knurled periphery.

* * * * *